Figure 4:
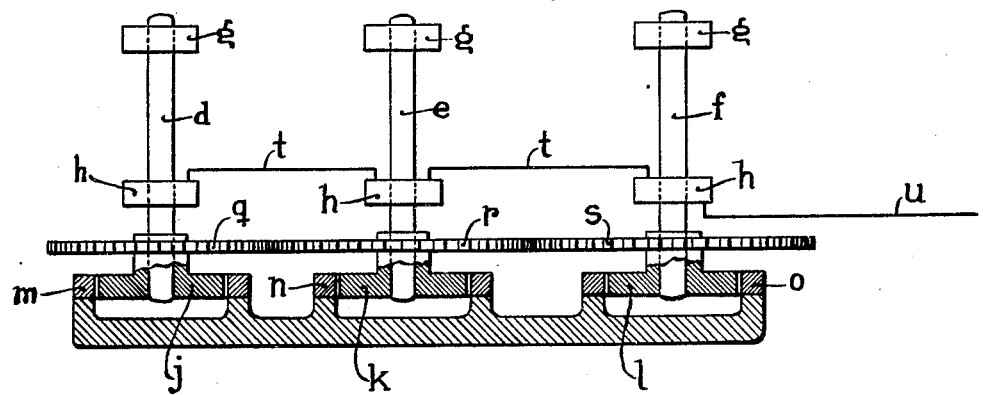

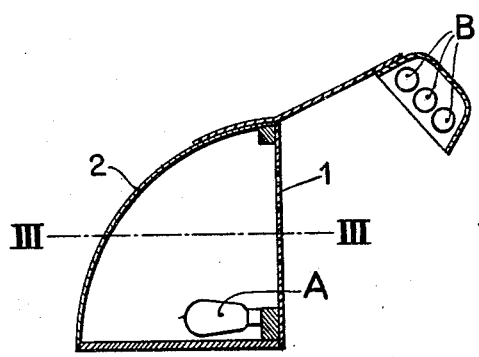
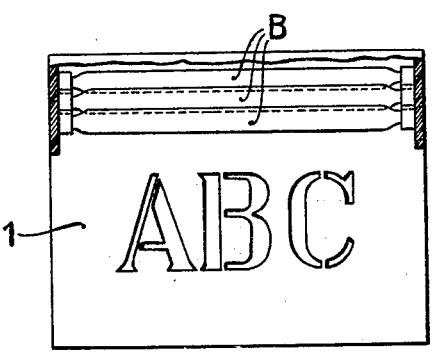
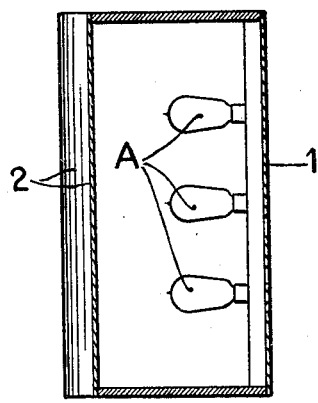

June 23, 1931.   H. M. RASMUSSEN   1,811,333
ART OF ILLUMINATION
Filed Dec. 10, 1928   2 Sheets-Sheet 2

Inventor
Holger Marius Rasmussen
by

Patented June 23, 1931

1,811,333

UNITED STATES PATENT OFFICE

HOLGER MARIUS RASMUSSEN, OF FAABORG, DENMARK

ART OF ILLUMINATION

Application filed December 10, 1928, Serial No. 325,003, and in Denmark December 10, 1927.

The present invention relates to an arrangement for colored illumination of objects or living beings, in particular for advertising purposes or for use in theatres or the like.

It has been found by experiments with colored signs that the eye is preferably attracted by such bills, the colors of which essentially are complements. While for example a sign made of red and yellow will not affect the eye essentially more forcibly than if it were made for example of green and yellow, the same sign in a red color and its complement, the green color, will be specially apt to attract the attention of the eye.

The invention is based on this observation and on the further development of the same, it having been proved that not only two complementary colors are particularly suited for the purpose stated, but also any other group of colors are suited if only the colors of such groups are of such a character that all rays of light from the group would give white light (sunlight) if they were collected, for example by means of a lens.

To arrest the attention of the eye on the object illuminated it is of advantage to change the color or colors periodically as is, for instance, the case with the known luminous advertisements.

The invention relates to an arrangement for utilizing the said conditions and the arrangement is essentially characterized by one, two or more groups of colored sources of light, the colors of which are so matched that the rays of light from all sources of light in one group would produce white light (sunlight) if they were collected by aid of a lens. The different groups in the arrangement, when two or more groups are employed, are besides mechanically or electrically or both mechanically and electrically coupled with each other, so that if one of the sources of light in a group is extinguished or shut off, a source of light of the same color in another group will be brought into operation. The light emitted by the arrangement will therefore always be of such a kind that it would produce white light if it were collected by a lens.

The main condition mentioned that the arrangement can operate in the manner desired, namely the condition that the light from all the sources of light in one group if collected produce white light, may for example be attained thereby that the group is formed of seven sources of light, each of its rainbow-color. It is however not necessary to employ more than three colors if these are the three colors red, blue and green. If now groups are employed to each of which belongs a multiple of sources of light, for example electric incandescent lamps, of each of the three colors mentioned, it will be feasible by varying by all possible means the combination of lamps switched on or switched off in such a group, to produce a large number of colors which each on mixing with the light from another group with opposite (complementary) combination of lights switched on or off, produces white light. Example: a group with three sets of lamps, that is to say, lamps colored each with one of the three colors, contains $n$ lamps in each set, so that the group thus contains $n$ red lamps, $n$ blue and $n$ green lamps, if these three colors are used it will be possible to attain $$(n+1)(n+1)(n+1) = (n+1)^3$$

different colors or grades of mixture. If $n$ is equal to 33, so that one group contains 99 lamps, 39304 different colors may be produced and as 33000 shades of colors are the maximum which the human eye can altogether distinguish from each other, with 99 lamps in each group that necessary for producing all colors will by far be exceeded.

In the accompanying drawings—

Fig. 1 is a transverse section showing the embodiment according to the invention of an arrangement provided with two groups of sources of light for advertising illumination, Fig. 2 shows a sign in front elevation partly in section, Fig. 3 is a longitudinal section on line III—III of Fig. 2, Fig. 4 is a diagram showing the embodiment of an arrangement for carrying out a coupling between two illuminating groups which are assumed each to consist of three electric incandescent lamps, each of its own color. The arrangement is shown from above, partly in section, and Fig. 5 is a wiring diagram for two groups and the arrangement shown in Fig. 2 of which arrangement some parts are seen in front view (from below in Fig. 2) and partly in section.

In Fig. 1 the numeral 1 indicates a plate seen from the side, which is assumed to be so perforated that the holes, for example, form the word which shall be advertised. 2 is a suitably formed screen which can reflect the rays of light emitted from a group A consisting of sources of light, so that the reflected rays pass out through the perforations in the plate 1. B is another group of light sources which illuminates the front of the plate 1.

If there be emitted red light from group A while group B emits the complementary green light, the word will be seen as red holes (for example circular disks) surrounded by green light. If the red light emitting light sources in group A are switched off or shut off while at the same time in this group light sources emitting a green light are switched on, the contrary will automatically take place in group B and the word will now be seen as green holes surrounded by red light, or in other words, as a word in one color or color combination surrounded by light of another color or color combination.

Figure 5:
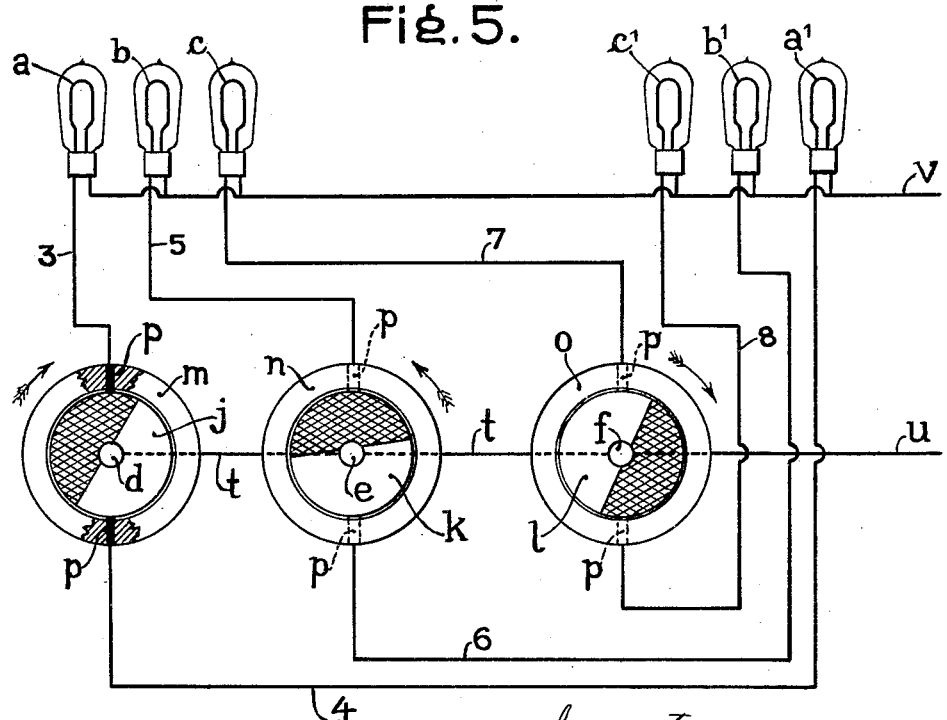

In the embodiment of the arrangement shown in Figs. 4 and 5 there belong to the latter two illuminating groups, each consisting of three incandescent lamps $a$, $b$ and $c$, respectively $a^1$, $b^1$ and $c^1$. The two groups are alike and the three lamps in each group have each their special color in such a manner that the lamps $a$ and $a^1$ are of the same color, the lamps $b$ and $b^1$ of the same color and the lamps $c$ and $c^1$ of the same color. In order to provide a coupling between the two illuminating groups and to render possible the production of the various color combinations, a commutator arrangement is employed which is arranged in the following manner: $d$, $e$ and $f$ are three parallel revoluble shafts each of which is journalled in two bearings $g$ and $h$. The shafts and the bearings $h$ are made of electrically conductive material.

On the forward end of each of the said shafts there is fitted a disk, $j$, $k$ and $l$, respectively, about the half part, in Fig. 5 the cross shaded part, of which is electrically conductive, while the remaining part of the disk is electrically insulating. Each disk is surrounded by a stationary, insulating ring $m$, $n$ and $o$, respectively, fitted and fixed in any suitable manner. At two diametrically opposite points of each of these rings there is radially passed through the material of the ring a carbon brush $p$ or the like, the inner end of which bears against the periphery of the respective disk $j$, $k$ or $l$. Each of these disks has a comparatively long hub, on which there is secured a toothed wheel, $q$, $r$ and $s$, respectively, which toothed wheels are in mesh with one another as shown and are of slightly different number of teeth (diameter), for example in such a manner that the wheel $q$ has $x$ teeth, the wheel $r$ has $x+1$ teeth and the wheel $s$ has $x+2$ teeth. The sleeves $h$ are electrically interconnected by the wires $t$. The driving power for the commutator arrangement may be an electromotor or a clockwork from which the motion is transmitted to the said toothed wheel, for example to the toothed wheel $q$.

The current to the incandescent lamps is supplied through the wires $u$ and $v$, of which the former is connected to the one shaft bearing $h$, and the one pole (end of the incandescent wire) of all the lamps is connected in parallel to the wire $v$ while the other lamp poles are connected according to their color in pairs with the carbon brushes $p$, namely in such a manner, cfr. Fig. 5 that from the one pole of lamp $a$ a wire 3 leads to the upper carbon brush $p$ of ring $m$, while a wire 4 leads from the one pole of lamp $a^1$ to the lower carbon brush of the ring $m$, that a wire 5 leads from the lamp $b$ to the upper carbon brush of the ring $n$ and a wire 6 from the lamp $b^1$ to the lower carbon brush of the ring $n$, and that a wire 7 leads from the one pole of the lamp $c$ to the upper carbon brush of the ring $o$ and a wire 8 from the one pole of the lamp $c^1$ to the lower carbon brush of the last mentioned ring.

The positions of the parts shown in Fig. 5 correspond to the lamps $a$ and $b$ being switched on, whilst the lamp $c$ is switched off, and the lamps $a^1$ and $b^1$ in the other group being switched off, whilst the lamp $c^1$ in this group is switched on.

It may be added that the conductive part and the non-conductive part of each of the disks $j$, $k$ and $l$ are thus suited relatively to each other that it is excluded with certainty that two like colored lamps (say, $a$ and $a^1$) belonging each to its respective illuminating group can be switched on or off at the same time.

The commutator arrangement may be arranged in various ways different from that described. It may be mentioned that the rings $m$, $n$ and $o$ can be replaced by stationary disks with which the rotating disks $j$, $k$ and $l$ can be held in contact, and each of which at two diametrically opposite points may have inlaid contacts. The embodiment shown has only been chosen to illustrate the arrangement in a simple and clear manner.

In the arrangement with two illuminating groups, each with three colors red ($r$), green ($g$) and blue ($b$), the changing may also be effected in the following manner so that a strengthening of the after-picture may be obtained by the contrast effect:

| Color change | The one illuminating group | The other illuminating group |
|---|---|---|
| 1' | $r$ | $g$ and $b$ |
| 2' | $g$ and $b$ | $r$ |
| 3' | $r$ and $g$ | $b$ |
| 4' | $b$ | $r$ and $g$ |
| 5' | $r$ and $b$ | $g$ |
| 6' | $g$ | $r$ and $b$ |
| 7' | $r$ and $g$ and $b$ | $o$ |
| 8' | $o$ | $r$ and $g$ and $b$ |

I claim:

1. The art of illuminating perforated objects, which comprises a plurality of groups of sources of colored light, the sources in any one group being components of and capable when taken together of producing white light, and directing the light of components of one group onto the object from one side thereof supplemented by light from another group on the other side of the object, the total light from the components of the groups on the object being the components of white light.

2. The art of illuminating a sign through portions of which light may pass, which comprises a plurality of groups of colored lights, the lights of each group when taken together forming white light, illuminating the sign by colored light from one group supplemented by the complementary colored light from another group on another side of the sign, the colored lights illuminating the sign when taken together being capable of forming white light.

3. The art of illuminating, which comprises directing primary colored light through a perforated sheet and simultaneously directing complementary colored light onto the face of the sheet.

4. The art of illumination, which comprises a plurality of groups of colored lights which taken together form white light, directing colored light from one group through a sheet through portions of which light may pass and directing complementary colored light from another group onto the face of the sheet, the total light on the sheet being the components of white light.

5. The art of illumination, which comprises a plurality of groups of colored lights which taken together form white light, directing colored light from one group through a sheet through portions of which light may pass and directing complementary colored light from another group onto the face of the sheet, the total light on the sheet being the components of white light and changing the relative duration of the components of white light during illumination.

6. The art of illumination, which comprises a plurality of groups of colored lights which taken together form white light, directing colored light from one group through a sheet through portions of which light may pass and directing complementary colored light from another group onto the face of the sheet, the total light on the sheet being the components of white light, and changing the relative duration of the components of white light during illumination with a period of no illumination.

7. Illuminated sign comprising a sign member having portions through which light may pass, a group of colored electric lamps on each side thereof, the light from each group combining to form white light, means to supply current to each lamp, mechanism to control the illumination of the lamps so that when one lamp is extinguished on one side of the member a lamp of the same color is illumined on the opposite side of the member.

In testimony that I claim the foregoing as my invention, I have signed my name.

HOLGER MARIUS RASMUSSEN.